United States Patent
Friedl et al.

[15] 3,679,997
[45] July 25, 1972

[54] NOBLE GAS-MOLECULAR NITROGEN LASER

[72] Inventors: Wolfgang Friedl, Neckargemund; Volker Schafer, Bruchkobel near Hanau, both of Germany

[73] Assignee: Original Hanau Quarzlampen GmbH, Hanau, Germany

[22] Filed: Oct. 21, 1970

[21] Appl. No.: 57,769

Related U.S. Application Data

[63] Continuation-in-part of Ser. No. 477,286, Aug. 4, 1965, abandoned.

[30] Foreign Application Priority Data

Aug. 4, 1972 Germany.....................Q 792

[52] U.S. Cl.............................................331/94.5
[51] Int. Cl................................................H01s 3/00
[58] Field of Search..................................331/94.5

[56] References Cited

UNITED STATES PATENTS

3,393,372  7/1968  Vickery et al. ...............331/94.5

OTHER PUBLICATIONS

Leonard: Applied Physics Letters, Vol. 7, pp. 4–6, July, 1965
Heard, Nature, Vol. 200, pp. 667, Nov. 1963
Mathias et al., Applied Physics Letters; Vol. 3, pp. 16–18, July, 1963.

*Primary Examiner*—Ronald L. Wibert
*Assistant Examiner*—Edward S. Bauer
*Attorney*—Otto John Munz

[57] ABSTRACT

Optical transmitter or amplifier apparatus having as its operating medium a gas mixture including a noble gas and up to about one mole per cent of molecular nitrogen, said mixture being maintained at pressures such that the range of partial pressures of the noble gas is about 10 to 500 Torr.

12 Claims, 1 Drawing Figure

3,679,997
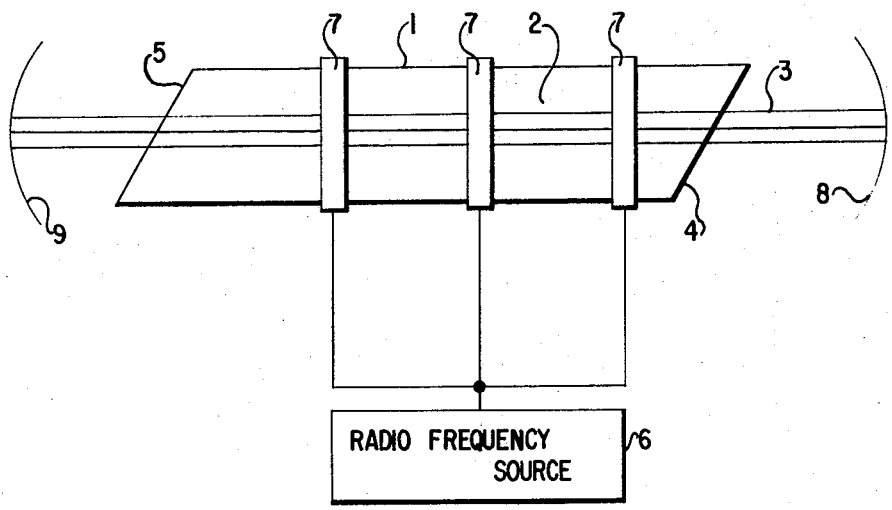
INVENTORS
WOLFGANG K. FRIEDL
VOLKER SCHAEFER
BY *Otto John Munz*
ATTORNEY

NOBLE GAS-MOLECULAR NITROGEN LASER

CROSS-REFERENCE TO RELATED APPLICATION

This application is a continuation-in-part of U.S. Pat. application Ser. No. 477,286, filed Aug. 4, 1965, now abandoned.

BACKGROUND OF THE INVENTION

The present invention generally pertains to an improvement in communication systems which employ means to abstract electro-magnetic energy and provide for escape of substantially coherent electro-magnetic radiation in a variety of wavelength ranges and for light amplification by stimulated emission of radiation. More particularly, the present invention pertains to an optical transmitter or amplifier system using gases as selectively fluorescent media for short wave radiation, preferably in the ultra-violet range.

To further limit the scope of the present invention, it employs an optical transmitter or amplifier with a mixture of a noble gas and molecular nitrogen as the fluorescent medium. Hereinbelow it will be defined as noble gas-molecular nitrogen laser.

In contrast with the teachings of the prior art, the excitation mechanism according to the present invention requires two sets of collisions ending in stimulated emissions from nitrogen molecules, rather than stimulated emission from atoms.

First, free electrons undergo elastic collisions with noble gas atoms. When the kinetic energy of the electrons becomes high enough, the lowest noble gas energy levels are excited by electron collision.

In accordance with the teachings of the present invention, the gas mixture, envelope diameter, partial pressures, and conditions of excitation are so chosen that the emission of radiation does not take place in the noble gas atoms. Rather, the noble gas atoms are allowed to transfer their exitation energy, without emission, to the nitrogen molecules, in a second set of collisions.

Further, according to the present invention, the collisions between energetic noble gas atoms and nitrogen molecules produces a population inversion in the triplet terms of the nitrogen molecules which, in turn, causes molecular emission of coherent radiation from the nitrogen molecules.

An example of the prior art may be found in the paper of William B. Bridges and Arthur N. Chester, Applied Optics, Vol. 4, pages 573 through 580 May, 1965, entitled "Visible and uv laser oscillation at 118 wave-lengths in ionized neon, argon, krypton, xenon, oxygen, and Other Gases." This paper of Bridges and Chester, which, as can be seen from its title, is principally concerned with the production of laser oscillation in ionized gases, speaks at page 577 of the reduction of ". . . one nitrogen line . . . by letting air into the discharge tube . . . ."

This nitrogen line is due to the splitting up of the nitrogen molecules into atoms, which become ionized, excited, and subsequently emit radiation. In the devices of the present invention, by contrast, the nitrogen molecules remain intact throughout the operation of the laser.

The mechanism by which the one nitrogen line of the paper of Bridges and Chester was produced differs in no way from the mechanism with which the paper of Bridges and Chester was primarily concerned, viz., emission from ionized noble gas atoms. Indeed, the nitrogen line report reported by Bridges and Chester was not reported to occur alone, but only simultaneously with noble gas lines. Thus, in the Bridges and Chester paper, excitation and emission take place in both nitrogen atoms and noble gas atoms.

In the devices of the present invention, by contrast, the excitation mechanism produces emission only in molecular nitrogen. The absence of emission from noble gas atoms is essential to the operation of the present invention, since the energy of the noble gas atoms must be used to excite the nitrogen molecules.

Moreover, the paper of Bridges and Chester relates to impulse operation, whereas the present invention concerns itself with continuous operation.

Another example of the prior art is the paper of C.K.N. Patel, and others, entitled "Optical Maser Action in C, N, O, S, and Br on Dissociation of Diatomic and Polyatomic Molecules," Physical Review, Volume 133, No. 5A, 2 Mar. 1964.

In the devices of this paper of Patel, emission is from atoms, not from molecules. The collision of an excited noble gas atom with NO or $N_2O$ molecules does not cause immediate excitation and emission. The initial effect is dissociation of the NO or $N_2O$ into excited atoms. These atoms, the dissociation product, emit radiation.

The devices of the present invention, by contrast, the nitrogen molecules remain intact throughout the operation of the laser.

In addition, the Patel paper refers to the employment of noble gases at partial pressures no greater than 2 Torr, whereas, according to the present invention, the noble gas pressure must be from about 10 to 500 Torr. Rather than being a matter of choice, this difference in pressure range is characteristic of the two lasers. According to the present invention, energy-consuming wall collisions by excited noble gas atoms are to be avoided in order to assure maximum transfer of energy to nitrogen molecules. In other words, the present invention depends upon the discovery that inelastic conditions with the discharge tube walls can be minimized by using a higher range of noble gas partial pressures than is taught in the prior art.

The Patel paper teaches the converse of this principle of the present invention. The dissociated atoms of the molecules of Patel must strike the wall of the discharge tube. The resultant energy loss produces unexcited atoms that can recombine and provide new molecules for dissociation. The necessary pressure ranges, as indicated in the Patel paper, are considerably lower, and do not suggest the novel noble gas partial pressure range of the present invention.

Another difference between the devices of the Patel paper and the devices of the present invention is the range of energies necessary to accomplish population inversion.

The molecular, as distinct from atomic, emission, which is characteristic of the present invention, requires specific energies due to distinct resonance conditions.

In contrast, Patel's population of the dissociated molecular atoms is accomplished over a broad, continuous range of energies.

A further distinction between the lasers of the present invention and those of the paper of Patel lies in the wavelengths emitted. The lasers of the paper of Patel operate entirely in the infrared, population inversions of atomic nitrogen yielding wave-lengths of 13, 583 and 14,544A., as shown in the first column on page A1247.

The lasers of the present invention, by way of contrast, produce a range of ultraviolet and visible wave-lengths from about 2,820 to 6,703 A., due to transition energies of the nitrogen molecule.

A further, and more dispositive, distinction between the teachings of the present invention and those of the Patel paper lies in the fact that the Patel paper does not concern itself with gas mixtures including pure molecular nitrogen, as does the present invention, but rather concerns itself with mixtures of two particular noble gases with either NO or $N_2O$. It is perhaps due to this distinction that Patel and his associates do not recognize the suitability of argon, krypton, and xenon, combined with nitrogen, as laser media. This recognition of the suitability of argon, krypton, and xenon is a feature of the present invention.

It cannot be said, however, that argon was not taken into consideration by Patel and his associates, since they teach (page A1247) that argon is indeed suitable as a lasing medium when combined with oxygen.

SUMMARY OF THE INVENTION

The primary object of the present invention is to provide an improvement over the conventional transmitters and amplifiers of the prior art, which are capable of impulse operation only, and operate in the ultraviolet range.

Another object of the invention is to provide noble gas-molecular nitrogen laser characterized by continuous operation.

Yet another object of the present invention is to provide a noble gas-molecular nitrogen laser which requires lower than conventional field intensities for excitation.

Another object of the invention is to provide a noble gas-molecular nitrogen laser employing gases as the negative temperature media for producing coherent radiation, preferably in the short-wave length range, and employing a mixture of a noble gas with molecular nitrogen.

Yet another object of the invention is to provide a system of the type described employing a mixture of helium with nitrogen.

Another object of the invention is to provide the system aforesaid employing a mixture of argon with nitrogen.

Still another object of the invention is to provide the aforesaid system using krypton as the noble gas.

Another object of the invention is the system mentioned before employing xenon as the noble gas.

Yet another object of the invention is to provide a laser using about one mole per cent of nitrogen in a mixture with noble gas.

Still another object of the invention is to provide the laser of the type mentioned with the noble gas under a pressure of about 10 to 500 Torr.

A further object of the invention is to provide the system mentioned above whereby the nitrogen molecules are excited by noble gas levels $s_5(^3P_2^0)$ and/or $s_3(^3P_0^0)$.

Other objects and many of the attendant advantages of the invention will become apparent to those skilled in the art from the following specification and claims.

For purposes of brevity pertinent portions of these disclosures well known to those skilled in the art are to be considered as incorporated into this specification by reference.

This invention may be practiced using excitation means of conventional discharge devices, of which the sole FIGURE is an example. There is shown in the sole figure an elongated quartz tube 1 defining an enclosed space for containing a noble gas-molecular nitrogen mixture 2. A light beam path 3 is defined by transparent windows 4 and 5, inclined at Brewster's angle. Radio frequency energy, supplied by a source 6, is applied to the gaseous medium by means of electrodes 7 which, in the illustrated embodiment, are external to the tube 1. If the device shown in the sole figure is to be used as a source or oscillator, a pair of reflectors 8 and 9 may be positioned adjacent the windows 4 and 5. Either reflector may be made partially transmissive to permit the light to be abstracted from the discharge device for utilization as desired.

DESCRIPTION OF THE PREFERRED EMBODIMENTS

In accordance with the present invention in order to bring about an effective reversal of the normal population distribution of energy levels of the applicable triplet term of the nitrogen molecule by means of relatively simple exciting expedients, the excitation of the $C^3\pi_u$ term of the nitrogen molecule is effected by collisions of the second kind between the metastable levels of the noble gas atoms and the nitrogen molecules. For this purpose a discharge in a noble gas-molecular nitrogen mixture is used, where the partial pressure of the nitrogen is not much greater than one percent of the partial pressure of the noble gas.

The excitation system effective in such a mixture is described as follows.

Since in the noble gas-molecular nitrogen mixture, the nitrogen molecules are present in only very low concentration, there is only a very small probability of collisions between free electrons and nitrogen molecules. The free electrons are more likely to collide with the noble gas atoms, the collisions remaining elastic until the kinetic energy of the electrons is sufficient to excite the lowest noble gas levels. When the noble gas pressures and the dimension of the container are chosen in such a manner that non-elastic collisions with the wall occur less often than collisions with nitrogen molecules, the noble gas atoms excited in this manner transfer their excitation energy, preferably by impulses of the second kind, to the nitrogen molecules. Noble gas pressures between about 10 to 500 Torr (mm Hg) are preferable for this purpose, depending on the cross-section of the discharge tube and the electric discharge parameters.

Optimum discharge conditions may be produced in tubes of about 1 to 30 mm diameter, with noble gas partial pressures of about 10 to 500 Torr, the smaller diameter tubes containing noble gas at higher pressures.

The inert gas atoms must be prevented from reverting to the basic state by collision with the walls of the apparatus without emitting radiation.

With very swift electrons, it is barely possible to excite directly triplet terms of the nitrogen molecule because for this purpose a reversal would have to be caused of the electron spin. A minimum time for the reversal during the impact, however, would be required which is not available with speedy electrons. With slow electrons in pure nitrogen the direct excitation of the triplet term becomes so prominent that practically no reversal of the normal excitation distribution of the triplet system is effected. An appreciable reversal of the excitation distribution of the triplet system in pure nitrogen is brought about in practice only with very strong fields, or at low pressures, in discharge tubes of large cross-section by energy transfers from singlet systems.

With noble gas-molecular nitrogen mixtures, on the other hand, it is possible to use relatively high pressures, relatively small cross-sections and lower field strengths for reversing the normal population distribution.

For the energy transfer, especially the $s_5$ ($^3P_2^0$) and the $s_3(^3P_0^0)$ levels of the inert gas that is used are employed.

Their excitation energies are -

Argon
  $s_5$ 11.55 $eV \triangle N_2$: second oscillation level of $C^3\pi_u$ at 11.5 eV
  $s_3$ 11.73 $eV \triangle N_2$: third oscillation level of $C^3\pi_u$ at 11.7 eV Krypton
  $s_5$ 9.91 $eV \triangle N_2$: fourteenth oscillation level of $B^3\pi_y$ at 10 eV Xenon
  $s_5$ 8.31 $eV \triangle N_2$: fifth oscillation level of $B^3\pi_u$ at 8.3 eV Among the oscillation levels excited by argon and xenon, the following transitions are primarily considered suitable.

Argon

| $C^3\pi\mu$ − | Second oscillation level | Third oscillation level | |
|---|---|---|---|
| (2 – 0): | *297.7 mm | (3–0): | *282.0 nm |
| (2 – 1): | 313.5 nm | (3–1): | 296.2 nm |
| (2 – 2): | 330.9 nm | (3— 2): | 311.6 nm |
| (2 – 3): | 350.0 nm | (3–3): | 328.5 nm |
| (2 – 4): | 371.0 nm | | |
| (2 – 6): | 394.2 nm | (3–5): | 367.1 nm |
| | | (3–6): | 389.4 nm |

*The numbers in parentheses are the oscillation quantum numbers at the beginning and end of each transition.

Xenon
  $B^3\pi_y$ - fifth oscillation level:
  (5–1): 612.6 nm
  (5–2): 670.3 nm To obtain short wave lengths, it is preferable to use argon.

When helium is used as the inert gas, then it is preferable to operate with an analogous energy transfer process on the initial levels of the so-called negative nitrogen bands. There will then be an emission of bands corresponding to the transitions between the two electron levels- $2\Sigma^+_u$ and $2\Sigma^+_g$ These lie approximately between 380 and 510 nm.

By changing to another one of the suggested inert gases, helium, argon, krypton or xenon, advantageously bands of either short or long wave length may be continuously obtained.

It is to be understood that the present disclosure only illustrates the invention in specific embodiments thereof and that various changes may be made by those skilled in the art without departing from the spirit and scope thereof as claimed.

We claim
1. A laser comprising:
a gas laser discharge tube containing a mixture of gases consisting of a noble gas and approximately one mole per cent of nitrogen molecular, the partial pressure of said noble gas lying in the range of about 10 to 500 Torr; and
radio frequency exciting means for exciting said noble gas so that energy is transferred from the noble gas to the molecules of nitrogen which emit continuous coherent ultra-violet radiation.

2. The laser of claim 1, wherein said noble gas is helium.

3. The laser as claimed in claim 2, comprising means to selectively excite the nitrogen molecules with an excitation energy at the initial levels of the negative nitrogen band.

4. The laser of claim 1, wherein said noble gas is argon.

5. The laser as claimed in claim 4, comprising means to selectively excite the nitrogen molecules at the argon gas levels excitation energy at $s_5(^3P_2{}^0)$.

6. The laser as claimed in claim 4, comprising means to selectively excite the nitrogen molecules at the argon gas levels excitation energy at $s_3(^3P_0{}^0)$.

7. The laser of claim 1, wherein said noble gas is krypton.

8. The laser as claimed in claim 7, comprising means to selectively excite the nitrogen molecules at the krypton gas levels excitation energy at $s_5(^3P_2{}^0)$.

9. The laser of claim 1, wherein said noble gas is xenon.

10. The laser as claimed in claim 9, comprising means to selectively excite the nitrogen molecules at xenon gas level excitation energy at $s_5(^3P_2{}^0)$.

11. An laser as claimed in claim 1, in which the a discharge tube has the diameter which lies in the range of about 1 to 30 mm and is inversely proportional to the partial pressure of the noble gas.

12. An laser as claimed in claim 1, in which said exciting means so excites said mixture of gases that the molecules of nitrogen remain unionized while emitting coherent ultraviolet radiation, and, at the same time, substantially none of the atoms of said noble gas emit radiation.

* * * * *